(12) United States Patent
Liu et al.

(10) Patent No.: US 12,128,651 B2
(45) Date of Patent: Oct. 29, 2024

(54) INTEGRATED COVER PLATE, METHOD FOR MANUFACTURING SAME, DISPLAY MODULE, AND DISPLAY DEVICE

(71) Applicant: BOE Technology Group Co., Ltd., Beijing (CN)

(72) Inventors: Yunjin Liu, Beijing (CN); Xiongnan Zhang, Beijing (CN); Shuang Du, Beijing (CN); Paoming Tsai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 95 days.

(21) Appl. No.: 17/568,432

(22) Filed: Jan. 4, 2022

(65) Prior Publication Data

US 2022/0227107 A1 Jul. 21, 2022

(30) Foreign Application Priority Data

Jan. 18, 2021 (CN) .......................... 202110062576.0

(51) Int. Cl.
*B32B 17/10* (2006.01)
*B32B 3/02* (2006.01)
(Continued)

(52) U.S. Cl.
CPC .......... *B32B 17/10366* (2013.01); *B32B 3/02* (2013.01); *B32B 3/30* (2013.01); *B32B 7/022* (2019.01); *B32B 7/023* (2019.01); *B32B 7/12* (2013.01); *B32B 2255/10* (2013.01); *B32B 2255/26* (2013.01); *B32B 2307/42* (2013.01);
(Continued)

(58) Field of Classification Search
CPC ....... B32B 17/10366; B32B 3/02; B32B 3/30; B32B 7/022; B32B 7/023; B32B 7/12; B32B 2255/10; B32B 2255/26; B32B 2307/42; B32B 2307/542; B32B 2307/732; B32B 2457/20; Y10T 428/12389
See application file for complete search history.

(56) References Cited

U.S. PATENT DOCUMENTS

2017/0226004 A1* 8/2017 Gorelchenko .......... C03C 17/32
2017/0317315 A1* 11/2017 Yang ..................... G06F 3/0412
(Continued)

FOREIGN PATENT DOCUMENTS

CN 104862975 B 1/2017
CN 104559190 B 2/2017
(Continued)

OTHER PUBLICATIONS

CN202110062576.0 first office action dated Sep. 12, 2024.

*Primary Examiner* — Michael Zhang
(74) *Attorney, Agent, or Firm* — IPro, PLLC

(57) ABSTRACT

Provided is an integrated cover plate. The integrated cover plate includes a main body and a shear thickening material layer. The main body includes a plurality of layered structures that are laminated, wherein the main body is provided with a facade formed by laminating side surfaces of the plurality of layered structures in the thickness direction, the shear thickening material layer covers at least part of the facade of the main body, and a viscosity of the shear thickening material layer increases with an increase of a shear rate and a shear stress.

17 Claims, 5 Drawing Sheets

(51) Int. Cl.
*B32B 3/30* (2006.01)
*B32B 7/022* (2019.01)
*B32B 7/023* (2019.01)
*B32B 7/12* (2006.01)

(52) U.S. Cl.
CPC ... *B32B 2307/542* (2013.01); *B32B 2307/732* (2013.01); *B32B 2457/20* (2013.01); *Y10T 428/12389* (2015.01)

(56) References Cited

U.S. PATENT DOCUMENTS

| | | | |
|---|---|---|---|
| 2018/0149786 A1* | 5/2018 | Lee | G02B 1/14 |
| 2019/0377386 A1* | 12/2019 | Heo | G06F 1/1637 |
| 2020/0189970 A1* | 6/2020 | Bookbinder | C03C 17/42 |
| 2020/0251682 A1 | 8/2020 | Guo et al. | |
| 2022/0118744 A1* | 4/2022 | Ouyang | B32B 7/12 |

FOREIGN PATENT DOCUMENTS

| | | | | |
|---|---|---|---|---|
| CN | 107728844 A | | 2/2018 | |
| CN | 109377889 A | | 2/2019 | |
| CN | 111290067 A | | 6/2020 | |
| CN | 111312782 A | | 6/2020 | |
| CN | 111667771 A | | 9/2020 | |
| CN | 215435434 U | * | 1/2022 | ....... B32B 17/10366 |
| JP | 2007087640 A | | 4/2007 | |
| KR | 100913185 B1 | | 8/2009 | |

* cited by examiner

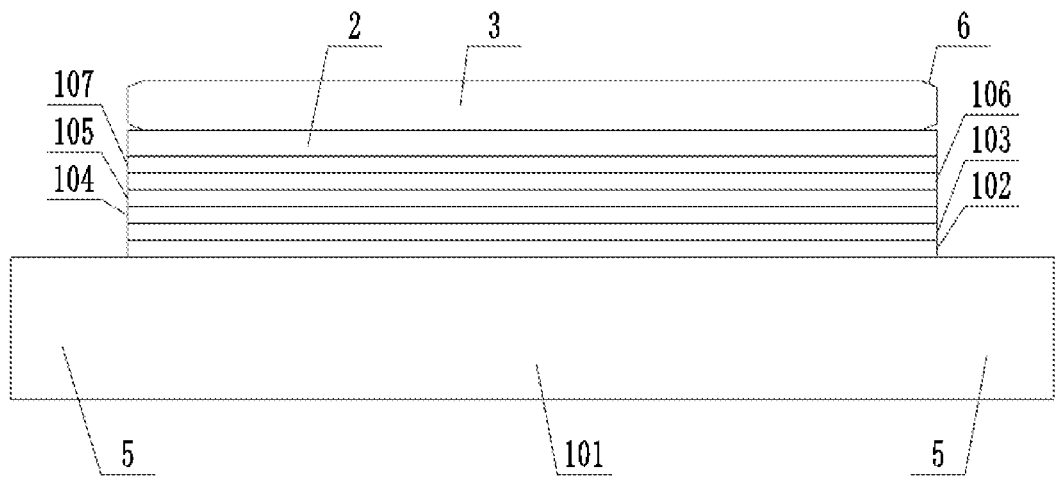
FIG. 10
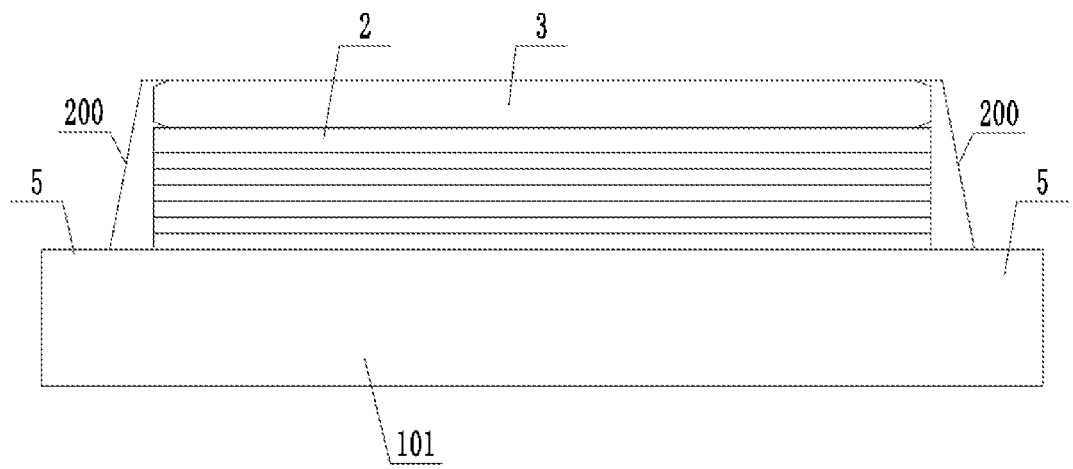
FIG. 11
```
                                                                    1201
  Forming a main body by sequentially laminating a plurality of
  layered structures, wherein the main body is provided with a
  facade formed by laminating side surfaces of the plurality of
                      layered structures
                              ↓
                                                                    1202
     Forming a shear thickening material layer on the facade of the
                           main body
```
FIG. 12

INTEGRATED COVER PLATE, METHOD FOR MANUFACTURING SAME, DISPLAY MODULE, AND DISPLAY DEVICE

CROSS-REFERENCE TO RELATED APPLICATION

This application is based on and claims priority to Chinese Patent Application No. 202110062576.0, filed on Jan. 18, 2021 and entitled "INTEGRATED COVER PLATE, METHOD FOR MANUFACTURING SAME, DISPLAY MODULE, AND DISPLAY DEVICE," the disclosure of which is herein incorporated by reference in its entirety.

TECHNICAL FIELD

The present disclosure relates to the field of display device technologies, and in particular, relates to an integrated cover plate, and a method for manufacturing the same, and further relates to a display module and a display device including the integrated cover plate.

BACKGROUND

A display module is a structure capable of implementing a display function. The display module may include a display function device and an integrated cover plate covering the display function device. The integrated cover plate may be configured to protect the display function device. The integrated cover plate may be formed of a layered structure such as high polymer and ultra-thin glass.

SUMMARY

Embodiments of the present disclosure provide an integrated cover plate, and a display module, and a display device including the integrated cover plate.

According to one aspect of the embodiments of the present disclosure, an integrated cover plate is provided.

The integrated cover plate includes: a main body, including a plurality of layered structures that are laminated, wherein the main body is provided with a facade formed by laminating side surfaces of the plurality of layered structures; and a shear thickening material layer, wherein the shear thickening material layer covers at least part of the facade of the main body, and a viscosity of the shear thickening material layer increases with an increase of a target value, wherein the target value includes a shear rate and a shear stress.

In some embodiments, the main body includes an optical layer, a first adhesive layer, and a reinforcing layer that are sequentially laminated, and the shear thickening material layer covers a side surface of the reinforcing layer and at least part of a side surface of the optical layer.

In some embodiments, a chamfer is formed on an edge of at least one of the plurality of layered structures, wherein the chamfer is covered by the thickening material layer.

In some embodiments, a chamfer is formed on an edge of the reinforcing layer.

In some embodiments, a material of the reinforcing layer includes one of polyimide, polyethylene terephthalate, or ultra-thin glass.

In some embodiments, a thickness of the reinforcing layer ranges from 30 μm to 100 μm.

In some embodiments, the first adhesive layer includes a pressure sensitive adhesive or an optical adhesive.

In some embodiments, the optical layer includes a substrate layer, a polarizing layer, a first retardation layer, and a second retardation layer that are sequentially laminated, wherein the second retardation layer is bonded to the reinforcing layer by the first adhesive layer.

In some embodiments, an edge of the substrate layer is provided with a protrusion protruding from an edge of another layered structure of the main body, wherein the shear thickening material layer extends from the side surface of the reinforcing layer to a surface, facing towards a side of the reinforcing layer, of the protrusion.

In some embodiments, the optical layer further includes a second adhesive layer disposed between the substrate layer and the polarizing layer, a third adhesive layer disposed between the polarizing layer and the first retardation layer, and a fourth adhesive layer disposed between the first retardation layer and the second retardation layer.

In some embodiments, a material of the substrate layer includes at least one of cyclo olefin polymer, polyethylene terephthalate, or polyimide.

In some embodiments, the first retardation layer includes a half-wave plate, and the second retardation layer includes a quarter-wave plate.

In some embodiments, the polarizing layer includes an iodine-based polarizing layer.

In some embodiments, a thickness of the polarizing layer ranges from 1 μm to 15 μm.

In some embodiments, a material of the shear thickening material layer includes one of a silicon-based polymer material, P4U, or a mixture of P4U, ethylene-vinyl acetate copolymer, and thermoplastic polyurethane elastomer.

In some embodiments, the shear thickening material layer surrounds the main body.

According to another aspect of the embodiments of the present disclosure, a method for manufacturing an integrated cover plate is provided.

The method includes: forming a main body by sequentially laminating a plurality of layered structures, wherein the main body is provided with a facade formed by laminating side surfaces of the plurality of layered structures; and forming a shear thickening material layer on the facade of the main body, wherein a viscosity of the shear thickening material layer increases with an increase of a target value, wherein the target value includes a shear rate and a shear stress.

In some embodiments, forming the shear thickening material layer on the facade of the main body includes: forming the shear thickening material layer on the facade of the main body by a coating process.

According to still another aspect of the embodiments of the present disclosure, a display module is provided.

The integrated cover plate includes: a main body, including a plurality of layered structures that are laminated, wherein the main body is provided with a facade formed by laminating side surfaces of the plurality of layered structures; a shear thickening material layer, wherein the shear thickening material layer covers at least part of the facade of the main body, and a viscosity of the shear thickening material layer increases with an increase of a target value, wherein the target value includes a shear rate and a shear stress.

According to yet still another aspect of the embodiments of the present disclosure, a display device is provided. The display device includes the display module as described above.

BRIEF DESCRIPTION OF THE DRAWINGS

The accompanying drawings constituting a part of the present disclosure are used to provide a further understanding of the present disclosure, and to make other features, purposes and advantages of the present disclosure more apparent. The exemplary embodiment accompanying drawings and description of the present disclosure are used to explain the present disclosure, and do not constitute an improper limitation of the present disclosure. In the accompanying drawings:

FIGS. 8 to 11 are schematic structural diagrams of products corresponding to the processes of a method for manufacturing an integrated cover plate according to some embodiments of the present disclosure; and FIG. 12 is a flowchart of a method for manufacturing an integrated cover plate according to an embodiment of the present disclosure.

REFERENCE NUMERALS AND DENOTATIONS THEREOF

Figure 1:
FIG. 1 is a cross-sectional view of an integrated cover plate according to an embodiment of the present disclosure.

100—main body; 200—shear thickening material layer; 1—optical layer; 101—substrate layer; 102—second adhesive layer; 103—polarizing layer, 104—third adhesive layer; 105—first retardation layer; 106—fourth adhesive layer; 107—second retardation layer; 2—first adhesive layer; 3—reinforcing layer; 4—release film; 5—protrusion; 6—chamfer.

DETAILED DESCRIPTION

For clearer descriptions of the principles and technical solutions of the embodiments of the present disclosure by those skilled in the art, the technical solutions of the embodiments of the present disclosure are described clearly and completely hereinafter in combination with the accompanying drawings. It is obvious that the described embodiments are merely part but not all of the embodiments of the present disclosure. All other embodiments acquired by those skilled in the art without creative efforts based on the embodiments in the present disclosure are within the protection scope of the present disclosure.

It should be noted that the terms "include," "comprise," and derivatives thereof in the description and claims of the present disclosure and the above accompanying drawings are intended to cover non-exclusive inclusion. For example, a system, product or device including a series of units need not be limited to those units clearly listed, but may include units that are not clearly listed or inherent to these products or device.

In the present disclosure, the orientation or positional relationship indicated by the terms "up," "down," "inside," "middle," "outside," and the like is based on the orientation or positional relationship shown in the accompanying drawings. These terms are mainly used to better describe the present disclosure and the embodiments thereof, and are not used to limit that the indicated devices, elements or components need to have a specific orientation, or be constructed and operated in a specific orientation.

In addition, some of the above terms may be used to express other meanings in addition to the orientation or positional relationship. For example, the term "up" may further be used to express an attachment or connection in some cases. For those skilled in the art, the specific meaning of these terms in the present disclosure may be understood based on the specific situation.

Besides, the terms "arrange," "connect," and "fix" should be understood in a broad sense. For example, the term "connection" may be fixed connection, removable connection, or integral construction; mechanical connection or electrical connection; direct or indirect connection by an intermediate medium, or the internal communication between two devices, elements or components. Those skilled in the art may understand the specific meaning of the above terms in the present disclosure based on the specific situation.

It should be noted that the embodiments of the present disclosure and the features in the embodiments may be combined with each other in the case of no conflict.

Currently, panels of foldable display devices are popular in the market and are widely employed in the field of display device technologies. A structure of a protective cover plate of a first generation flexible foldable display device is a polymer integrated structure, which is generally made of materials with high transmittance and without special optical property, but the ball dropping performance and pen dropping performance of the protective cover plate are poor. The second generation flexible foldable display device employs an integrated cover plate with an integrated structure of layered structure such as polymer and ultra-thin glass. The impact resistance of such integrated cover plate is improved to a certain extent. However, edges of the layered structure, such as ultra-thin glass, are subject to some defects in terms of number and size, and thus the layered structure, when being impacted, is prone to crack propagation and failure. That is, the edge of the integrated cover plate has poor impact resistance.

The embodiments of the present disclosure provide an integrated cover plate, a method for manufacturing the same, a display module and a display device, which can solve some problems in the related art.

Figure 2:
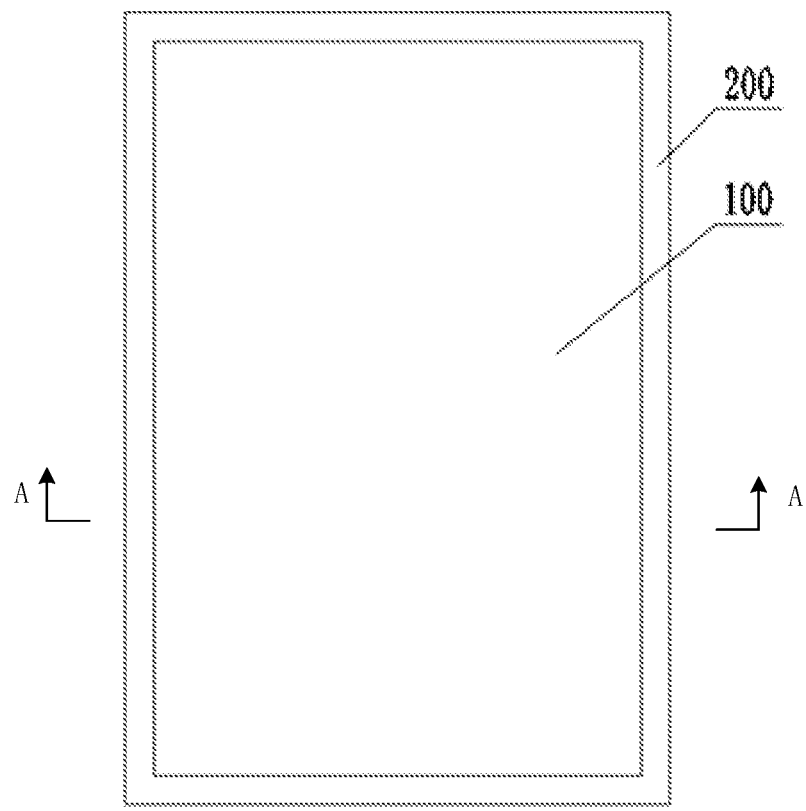
FIG. 2 is a top view of the integrated cover plate shown in FIG. 1 of an embodiment of the present disclosure.

Referring to FIG. 1 and FIG. 2 (FIG. 1 is a sectional view of a plane A-A in FIG. 2), an embodiment of the present disclosure provides an integrated cover plate. The integrated cover plate includes a main body 100 and a shear thickening material layer 200. The main body 100 includes a plurality of layered structures that are laminated, and the main body 100 is provided with a facade formed by laminating side faces of the plurality of layered structures. The shear thickening material layer covers at least part of the facade of the main body, a viscosity of the shear thickening material layer increases with an increase of a shear rate or a shear stress. The main body composed of the plurality of layered structures includes a top surface, a bottom surface, and the facade. The top surface is a surface, distal from another layered structures, of an uppermost layered structure in the main body 100. The bottom surface is a surface, distal from another layered structures, of a lowermost layered structure in the main body 100. The facade is a surface connecting the top surface and the bottom surface, and the facade is not limited to a plane, but may further be a stepped surface, a curved surface, or the like, which is not limited in the embodiments of the present disclosure. The uppermost layered structure refers to a layered structure furthest from a display function device in the main body in the case that the integrated cover plate is disposed in a display module. Correspondingly, the lowermost layered structure is a layered structure closest to the display function device in the main body.

In the integrated cover plate according to the embodiments, the shear thickening material layer 200 is disposed at an edge of the main body 100, such that an edge of the integrated cover plate, when not being impacted, is softer to ensure the bending performance of the integrated cover plate, and the edge of the integrated cover plate, when being impacted, would quickly harden to protect the edge of the layered structure. Therefore, the generation and propagation of crack sources may be prevented, the yield may be improved in the machine assembling process, and the cost may be reduced.

In the above embodiments, a material of the shear thickening material layer 200 is selected as a non-Newtonian fluid with a shear thickening phenomenon. The shear thickening phenomenon is an inherent characteristic of some non-Newtonian fluids, also referred to as a dilatancy, which represents a non-Newtonian fluid behavior that the viscosity of the material increases with the increase of the shear rate or the shear stress. A shear thickening material refers to a material with shear thickening property. In the case that the shear thickening material is loaded with instantaneous severe external force, molecules of the material lock each other and the hardness increases, thereby improving an ability to resist the instantaneous external force is improved. Moreover, the above process is reversible and the conversion time is very short, for example, it may reach a millisecond level. The non-Newtonian fluid is a fluid that does not meet the viscosity experiment law of Newton. That is, a relationship between the shear stress and a shear strain rate is not linear. The viscosity is sensitive to the shear speed, and a case where the viscosity of the non-Newtonian fluid increases with the increase of shear speed is referred to as the shear thickening phenomenon.

Using the solution in the above embodiments, edges of the layered structures of the main body 100 are covered by the shear thickening material layer 200, which may protect the edges of the layered structures of the main body 100. In the case that the non-Newtonian fluid as the shear thickening material layer 200 is subjected to a relatively weak impact, the non-Newtonian fluid is not produce the shear thickening phenomenon. In the case that the non-Newtonian fluid as the shear thickening material layer 200 is subjected to an instantaneous impact or a continuous strong vibration, a density of the non-Newtonian fluid increases instantaneously under an action of the shear thickening phenomenon to provide an instantaneous strong support similar to a performance of a solid for the main body 100. Employing the above shear thickening material layer 200 as the protective structure, power or any other signal drive control is not needed. Therefore, the integrated cover plate may obtain real time protection of the shear thickening material layer 200 in a non-operating state or in the transportation process, and has the performance of anti-vibration and anti-impact.

According to the specific embodiments in the present disclosure, the shear thickening material forming the shear thickening material layer 200 is not particularly limited, and those skilled in the art may select familiar materials to form the shear thickening material with a shear thickening effect according to actual needs. For example, the material of the shear thickening material layer 200 may include a silicon-based polymer material. The method for synthesizing the silicon-based polymer material may first include mixing siloxane, boric acid and white carbon black, then adding dimethyl silicone oil and evenly mixing to synthesize a colloidal silicon-based polymer material. The colloidal silica polymer material may be used as the material of the shear thickening material layer 200. For another example, the material of the shear thickening material layer 200 may include P4U, which is developed by the "P4U" intelligent material team of Xi'an University of Technology. The specific material composition may be referred to the patent publications with publication numbers CN104559190B and CN 104862975B. P4U is a non-Newtonian fluid material, which remains relaxed in normal state, and is soft and elastic. In the case that P4U is subjected to a violent collision or impact, the molecules are immediately lock each other, and quickly tighten and harden to digest external force and form a protective layer. In the case that the external force disappears, the material returns to the original relaxed and soft elastic state, and it can make different responses to different impact situations in an instant. For another example, the material of the shear thickening material layer 200 may further include a mixture of P4U, ethylene-vinyl acetate copolymer (EVA), and thermoplastic polyurethanes (TPU). Some properties of the material may be adjusted by adding EVA and TPU to P4U, and those skilled in the art can make corresponding adjustments.

In some embodiments, as shown in FIG. 2, the shear thickening material layer 200 in the integrated cover plate is arranged around the main body 100. The arrangement may realize 360° protection of the edge of the main body 100, and the shear thickening material layer 200 may play a role no matter which direction the edge of the main body 100 is impacted. Specifically, in FIG. 2 (FIG. 2 is a view of the integrated cover plate viewed in a direction perpendicular to the plate surface of the integrated cover plate), a shape of the integrated cover plate is a rectangle, and a shape of an end surface of the shear thickening material layer 200 is a rectangular ring arranged around the main body 100.

In some embodiments, the layered structures forming the main body 100 are specifically determined based on the design and use requirements of the integrated cover plate, which are not specifically limited in the present disclosure. As an example, the accompanying drawings of the description of the present disclosure show a specific layered structure of the main body 100. As shown in FIG. 1, the main body 100 includes an optical layer 1, a first adhesive layer 2 and a reinforcing layer 3 that are sequentially laminated. The reinforcing layer 3 is connected to the optical layer 1 by the first adhesive layer 2. The thickening material layer 200 covers all side surfaces of the reinforcing layer 3, all side surfaces of the first adhesive layer 2, and part or all side surfaces of the optical layer 1.

In the structure of the integrated cover plate shown in FIG. 1, a material of the reinforcing layer 3 includes one of polyimide (PI), polyethylene glycol terephthalate (PET), or ultra-thin glass, and a thickness of the reinforcing layer may generally range from 30 μm to 100 μm. A material of the first adhesive layer 2 may be selected from a pressure sensitive adhesive (PSA) or an optically clear adhesive (OCA), and the specific material may include acrylic, silicone, and polyurethane.

Figure 6:
FIG. 6 is a cross-sectional view of an optical layer structure according to an embodiment of the present disclosure.
Figure 7:
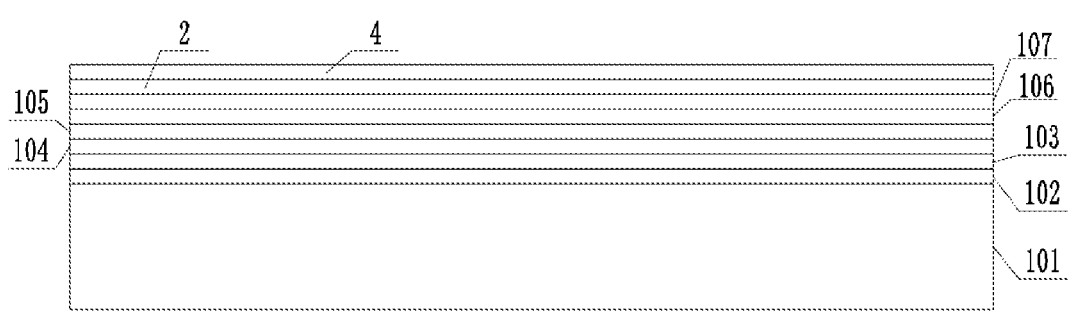
FIG. 7 is a cross-sectional view of another optical layer structure according to an embodiment of the present disclosure.

In some embodiments, the optical layer 1 in the structure of the integrated cover plate includes a substrate layer 101, a polarizing layer 103, a first retardation layer 105 and a second retardation layer 107 that are sequentially laminated. Adjacent layers are connected by an adhesive layer, and the second retardation layer 107 is connected to the reinforcing layer 3 by the first adhesive layer 2. As shown in FIG. 6, specific arrangement of the optical layer 1 is provided. The optical layer 1 includes a substrate layer 101, a second adhesive layer 102, a polarizing layer 103, a third adhesive layer 104, a first retardation layer 105, a fourth adhesive layer 106, and a second retardation layer 107 that are sequentially laminated. In addition, to achieve rapid connection to the reinforcing layer 3, as shown in FIG. 7, the first adhesive layer 2 may be disposed on a surface, distal from the fourth adhesive layer 106, of the second retardation layer 107, and the release film 4 is bonded on a surface of the first adhesive layer 2.

It should be understood that a material of the substrate layer 101 in the embodiments of the present disclosure includes, but is not limited to, cyclo olefin polymer (COP), polyethylene glycol terephthalate (PET), or polyimide (PI), which not only possesses a waterproof effect, but also possesses a good flexibility. Such design may further ensure that the entire integrated cover plate possesses a good flexibility and is easy to bend. The substrate layer 101 is disposed on a side, distal from the first retardation layer 105, of the polarizing layer 103. The substrate layer 101 may protect the polarizing layer 103, and may further improve the overall flatness of the optical layer 1. A thickness of the substrate layer 101 may range from 10 μm to 50 μm, which may ensure not only a good support performance, but also a bendable performance of the substrate layer 101. The substrate layer 101 is bonded to the polarizing layer 103 by the second adhesive layer 102. A material of the second adhesive layer 102 may include polymethyl methacrylate, that is, acrylic glue. A thickness of the second adhesive layer 102 may range from 0.1 μm to 3 μm, but is not limited to the range, which depends on the specific situation.

It should be understood that the polarizing layer 103 in the embodiments of the present disclosure may include an acidic substance, which refers to a substance that is acidic when being exposed to water. For example, the polarizing layer 103 in the embodiments of the present disclosure may be an iodine-based polarizing layer 103, the iodine-based polarizing layer 103 is obtained by dyeing with an iodine dye, and achieves a polarizing performance based on the optical dichroism containing crystals. When being dyed, an iodine element is present in the polarizing layer 103 in the form of an iodide ion, and the iodide ion is acidic, that is, the aforementioned acidic substance may include the iodine element. The manufacturing method may include: immersing a polyvinyl alcohol (PVA) film in an iodide ion solution to diffuse the iodide ions into the PVA film, stretching when being slightly heated. The PVA film becomes narrow and thin while becoming longer. PVA molecules are originally distributed randomly at any angle, and when being stretched by force, the PVA molecules are gradually and uniformly deflect along a direction of the force. The dichroic iodine molecules attached to the PVA further follow the directionality, thus obtaining a polarizing layer 103 having a polarizing effect. A thickness of the polarizing layer 103 preferably ranges from 1 μm to 15 μm, but is not limited to the range. Specifically, the thickness of the polarizing layer 103 may further be within other value ranges, which depends on the specific situation.

It should be understood that the first retardation layer 105 in the embodiments of the present disclosure may be a half-wave plate, and the second retardation layer 107 is preferably a quarter-wave plate, which is configured to control and adjust the polarization characteristics of photons by the joint action of the half-wave plate and the quarter-wave plate. The half-wave plate is connected to the polarizing layer 103 by the third adhesive layer 104, the half-wave plate is bonded to the quarter-wave plate by the fourth adhesive layer 106, and thicknesses of the half-wave plate and the quarter-wave plate may range from 0.1 μm to 5 μm, but is not limited to the range. And thicknesses of both the third adhesive layer 104 and the fourth adhesive layer 106 may range from 0.1 μm to 3 μm, but not limited to the range. Materials of the third adhesive layer 104 and the fourth adhesive layer 106 may include polymethyl methacrylate, that is, the third adhesive layer 104 and the fourth adhesive layer 106 may be acrylic adhesive, which may effectively ensure the bonding stability of the second retardation layer 107, the first retardation layer 105 and the polarizing layer 103. Polymethyl methacrylate may further effectively prevent the iodine ions in the polarizing layer 103 from penetrating.

It should be understood that the release film 4 in the embodiments of the present disclosure is bonded to the second retardation layer 107 by the first adhesive layer 2, which may protect the entire optical layer 1. In the case that the optical layer 1 needs to be bonded to the reinforcing layer 3, the release film 4 merely needs to be released to expose the first adhesive layer 2, and then bond the first adhesive layer 2 and the reinforcing layer 3 together.

Figure 3:
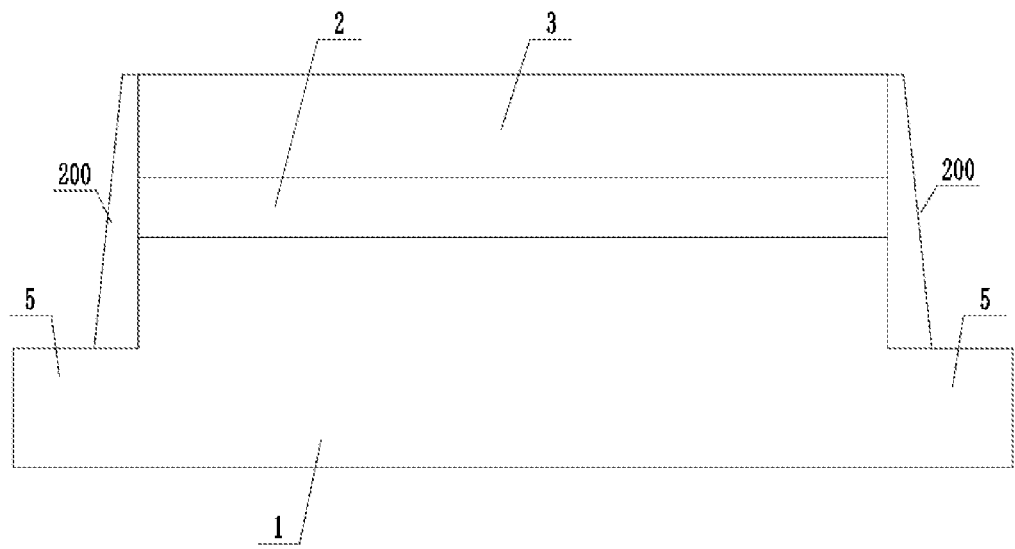
FIG. 3 is a cross-sectional view of another integrated cover plate according to an embodiment of the present disclosure.
Figure 4:
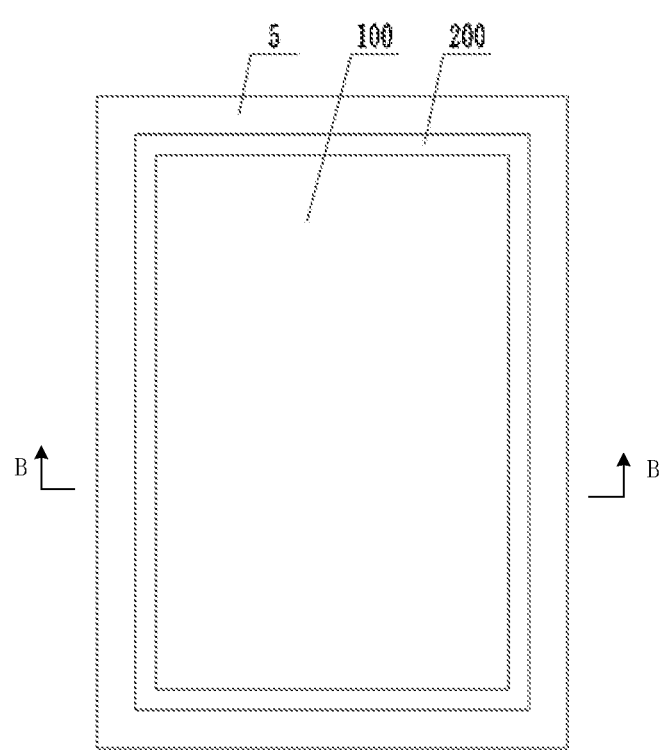
FIG. 4 is a top view of the integrated cover plate shown in FIG. 3 of an embodiment of the present disclosure.
Figure 5:
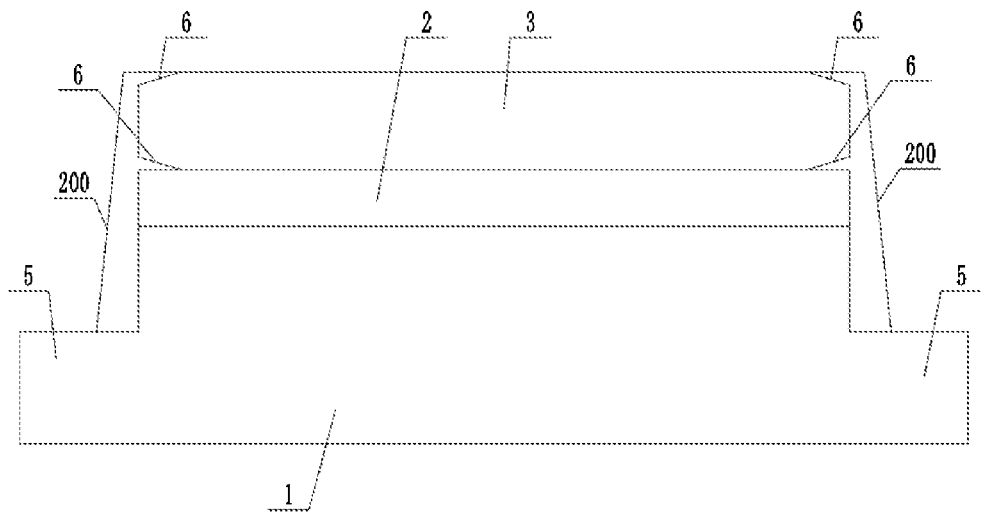
FIG. 5 is a cross-sectional view of another integrated cover plate according to an embodiment of the present disclosure.

Referring to FIG. 3. FIG. 4 (FIG. 3 is a sectional view of a plane B-B in FIG. 4), and FIG. 5, in some embodiments, an edge of the substrate layer 101 is provided with a protrusion 5 protruding from an edge of another layered structure of the main body 100, and the protrusion 5 may be formed by extending the edge of the substrate layer 101 outward. The shear thickening material layer 200 extends from the side surface of the reinforcing layer 3 to a surface, facing a side of the reinforcing layer 3, of the protrusion 5. The surface, facing the side of the reinforcing layer 3, of the protrusion 5 is not disposed with another layered structure, which provides a reserved space for an ink frame process in the subsequent process of manufacturing the display module. In addition, a right-angled structure is formed between the protrusion 5 and the other portions of the main body 100. The shear thickening material layer 200 is simultaneously in contact with the facade of the main body 100 and an upper surface of the protrusion 5 in the right-angled structure area, which increases the contact area. The shear thickening material is attached in the area from two directions, which improves the firmness of the connection between the shear thickening material layer 200 and the main body 100. The shear thickening material is difficult to separate from the main body 100 from one end of the substrate layer 101 due to the blocking of the protrusion 5.

In some embodiments, an edge of at least one of the plurality of layered structures forms a chamfer 6, and the chamfer 6 is covered by the thickening material layer 200. By disposing the chamfer 6, the contact area between the shear thickening material layer 200 and the main body 100 may be increased, and the shear thickening material layer 200 forms an antenna structure extending into the chamfer 6 area at the chamfer 6. The antenna structure may effectively limit the movement of the shear thickening material layer 200 relative to the main body 100, and improve the firmness of the connection between the shear thickening material layer 200 and the main body 100. For example, in FIG. 5, the chamfer 6 is disposed on an upper edge and a lower edge of the reinforcing layer 3. The chamfer 6 may be formed by polishing or etching.

In the integrated cover plate according to the embodiments, the shear thickening material layer is disposed at an edge of the main body, such that an edge of the integrated cover plate, when not being impacted, is softer to ensure the bending performance of the integrated cover plate, and the edge of the integrated cover plate, when being impacted, would quickly harden to protect the edge of the layered structure. Therefore, the generation and propagation of crack sources may be prevented, the yield may be improved in the assembling process, and the cost may be reduced.

FIG. 12 is a schematic flowchart of a method for manufacturing an integrated cover plate according to an embodiment of the present disclosure, which may be employed to manufacture the integrated cover plate in any of the above technical solutions. The method for manufacturing an integrated cover plate includes the following processes 1201 and 1202.

In S1201, a main body is formed by sequentially laminating a plurality of layered structures, wherein the main body is provided with a facade formed by laminating side surfaces of the plurality of layered structures.

Figure 8:
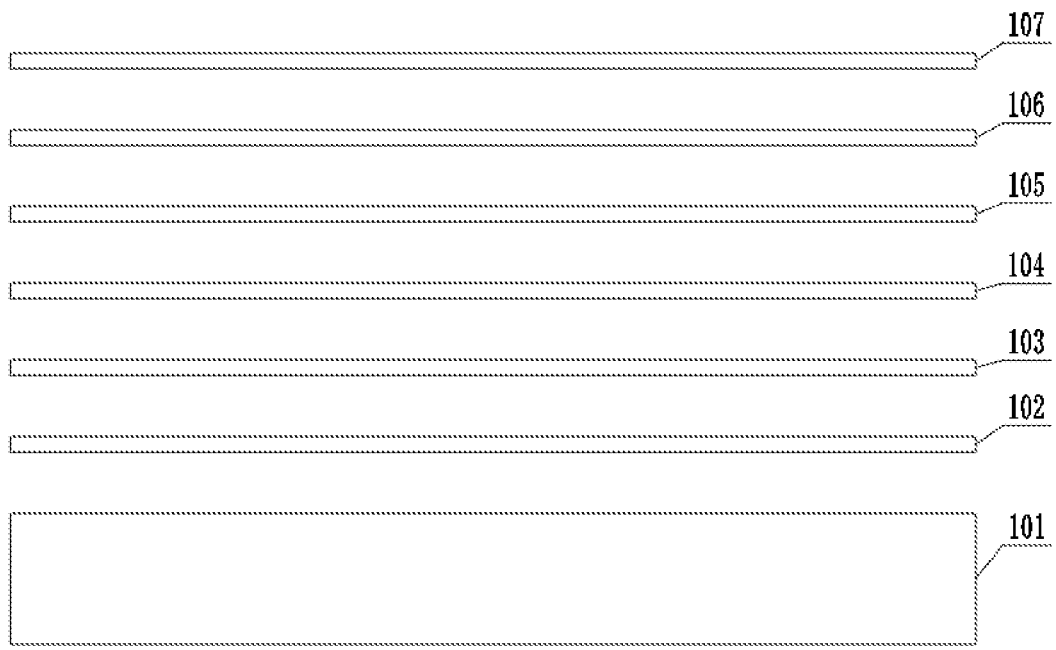
Figure 9:
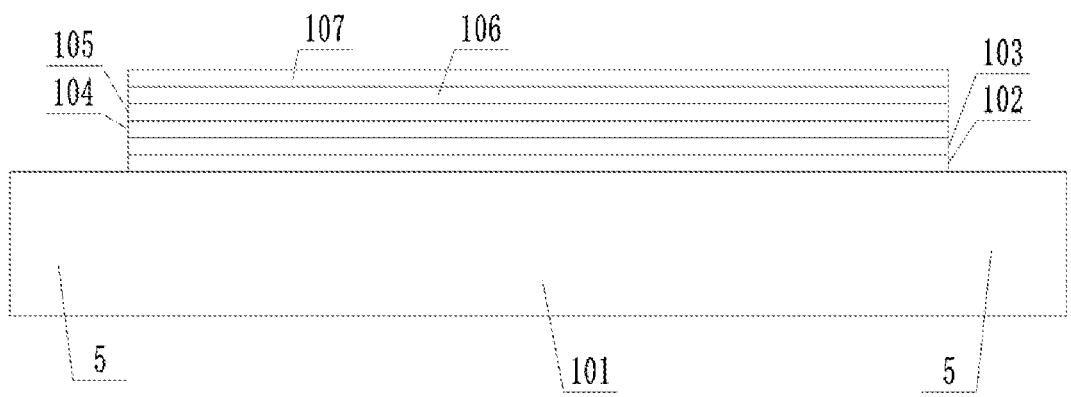

Specifically, in this process, firstly, referring to FIG. 8, a substrate layer 101, a second adhesive layer 102, a polarizing layer 103, a third adhesive layer 104, a first retardation layer 105, a fourth adhesive layer 106, and a second retardation layer 107 are sequentially laminated to form the optical layer 1 shown in FIG. 6. Then, referring to FIG. 9, the optical layer 1 is cut to the substrate layer 101, such that the substrate layer 101 forms a protrusion 5, the specific cutting manner may be laser cutting. Then, referring to FIG. 10, a reinforcing layer 3 is fixed on the optical layer 1 by the first adhesive layer 2 to form a structure of the main body 100.

It should be noted that the process of cutting the optical layer 1 to the substrate layer is an optional process, and those skilled in the art may decide whether to perform the process base on the requirements of subsequent processes.

In S1202, a shear thickening material layer is formed on the facade of the main body.

A viscosity of the shear thickening material layer increases with an increase of a target value, wherein the target value includes a shear rate and a shear stress. In the process, referring to FIG. 11, the shear thickening material layer 200 may be formed on the facade of the main body 100 by a coating process. The specific manner of the coating process is not particularly limited, and may be selected by those skilled in the art according to the actual situation. For example, the shear thickening material may be disposed on the facade of the main body 100 by methods including but not limited to spraying, coating, scraping, and the like, so as to form the shear thickening material layer 200 including the shear thickening material.

The above is the exemplary description and illustration of the integrated cover plate and the method for manufacturing the same according to the embodiments of the present disclosure. Other components of the integrated cover plate and other operations of the manufacturing method are known to persons of ordinary skill in the art, which is not described in detail herein, and those skilled in the art may refer to the records of the related art for understanding and application.

The embodiments of the present disclosure further provide a display module. The display module includes the integrated cover plate according to the above embodiments of present disclosure. The display module disclosed in the embodiments of the present disclosure includes the integrated cover plate according to the above-mentioned embodiment, and the display module including the integrated cover plate further possesses all the above technical effects, which are not repeated herein. The display module may further include a display function device for realizing the display function of the display module. For example, the display function device may include an organic light emitting diode.

The embodiments of the present disclosure further provide a display device. The display device includes the display module according to the above embodiments of present disclosure. The display device may be any product or component with a display function such as a liquid crystal panel, an electronic paper, an organic light-emitting diode (OLED) panel, an active matrix organic light-emitting diode (AMOLED) panel, a mobile phone, a tablet computer, a television, a monitor, a notebook computer, a digital photo frame or a navigator. The display device disclosed in the embodiments of the present disclosure includes the display module according to the above-mentioned embodiments, and the display device including the display module further possesses all the above technical effects, which are not repeated herein.

Other components, principles, and manufacturing methods of the display module and the display device are known to those of ordinary skill in the art, which is not described in detail herein.

Some embodiments in this description are described in a progressive manner, each embodiment focuses on the differences from other embodiments, and the same and similar portions of each embodiment may be referred to each other.

Described above are merely specific embodiments of the present disclosure, which are illustrated to enable those skilled in the art to understand or practice the present disclosure. It is obvious that those skilled in the art could derive various modifications from these embodiments, and the general principles defined herein may be observed in other embodiments without departing from the spirit or scope of the present disclosure. Therefore, the present disclosure is not limited to the embodiments shown herein, but should conform to the scope subject to the appended claims of the present disclosure.

What is claimed is:

1. An integrated cover plate, comprising:
   a main body, comprising a plurality of layered structures that are laminated, wherein the main body is provided with a facade formed by laminating side surfaces of the plurality of layered structures;
   a shear thickening material layer, wherein the shear thickening material layer covers at least part of the facade of the main body, and a viscosity of the shear thickening material layer increases with an increase of a shear rate or a shear stress;
   wherein the main body comprises an optical layer, a first adhesive layer, and a reinforcing layer that are sequentially laminated, and the shear thickening material layer covers a side surface of the reinforcing layer and at least part of a side surface of the optical layer;
   the optical layer comprises a substrate layer, a polarizing layer, a first retardation layer, and a second retardation layer that are sequentially laminated, wherein the second retardation layer is bonded to the reinforcing layer by the first adhesive layer;
   an edge of the substrate layer is provided with a protrusion protruding from an edge of another layered structure of the main body, wherein the shear thickening material layer extends from the side surface of the reinforcing layer to a surface, facing towards a side of the reinforcing layer, of the protrusion.

2. The integrated cover plate according to claim 1, wherein a chamfer is formed on an edge of at least one of the plurality of layered structures, wherein the chamfer is covered by the thickening material layer.

3. The integrated cover plate according to claim 1, wherein a chamfer is formed on an edge of the reinforcing layer.

4. The integrated cover plate according to claim 1, wherein a material of the reinforcing layer comprises one of polyimide, polyethylene terephthalate, or ultra-thin glass.

5. The integrated cover plate according to claim 1, wherein a thickness of the reinforcing layer ranges from 30 μm to 100 μm.

6. The integrated cover plate according to claim 1, wherein the first adhesive layer comprises a pressure sensitive adhesive or an optical adhesive.

7. The integrated cover plate according to claim 1, wherein the optical layer further comprises a second adhesive layer disposed between the substrate layer and the polarizing layer, a third adhesive layer disposed between the polarizing layer and the first retardation layer, and a fourth adhesive layer disposed between the first retardation layer and the second retardation layer.

8. The integrated cover plate according to claim 1, wherein a material of the substrate layer comprises at least one of cyclo olefin polymer, polyethylene terephthalate, or polyimide.

9. The integrated cover plate according to claim 1, wherein the first retardation layer comprises a half-wave plate, and the second retardation layer comprises a quarter-wave plate.

10. The integrated cover plate according to claim 1, wherein the polarizing layer comprises an iodine-based polarizing layer.

11. The integrated cover plate according to claim 10, wherein a thickness of the polarizing layer ranges from 1 μm to 15 μm.

12. The integrated cover plate according to claim 1, wherein a material of the shear thickening material layer comprises one of a silicon-based polymer material, P4U, or a mixture of P4U, ethylene-vinyl acetate copolymer, and thermoplastic polyurethane elastomer.

13. The integrated cover plate according to claim 1, wherein the shear thickening material layer surrounds the main body.

14. A method for manufacturing an integrated cover plate, comprising:
   forming a main body by sequentially laminating a plurality of layered structures, wherein the main body is provided with a facade formed by laminating side surfaces of the plurality of layered structures;
   forming a shear thickening material layer on the facade of the main body, wherein a viscosity of the shear thickening material layer increases with an increase of a shear rate or a shear stress;
   wherein the main body comprises an optical layer, a first adhesive layer, and a reinforcing layer that are sequentially laminated, and the shear thickening material layer covers a side surface of the reinforcing layer and at least part of a side surface of the optical layer;
   the optical layer comprises a substrate layer, a polarizing layer, a first retardation layer, and a second retardation layer that are sequentially laminated, wherein the second retardation layer is bonded to the reinforcing layer by the first adhesive layer;
   an edge of the substrate layer is provided with a protrusion protruding from an edge of another layered structure of the main body, wherein the shear thickening material layer extends from the side surface of the reinforcing layer to a surface, facing towards a side of the reinforcing layer, of the protrusion.

15. The method according to claim 14, wherein forming the shear thickening material layer on the facade of the main body comprises:
   forming the shear thickening material layer on the facade of the main body by a coating process.

16. A display module, comprising an integrated cover plate, wherein the integrated cover plate comprises:
   a main body, comprising a plurality of layered structures that are laminated, wherein the main body is provided with a facade formed by laminating side surfaces of the plurality of layered structures;
   a shear thickening material layer, wherein the shear thickening material layer covers at least part of the facade of the main body, and a viscosity of the shear thickening material layer increases with an increase of a shear rate or a shear stress;
   wherein the main body comprises an optical layer, a first adhesive layer, and a reinforcing layer that are sequentially laminated, and the shear thickening material layer covers a side surface of the reinforcing layer and at least part of a side surface of the optical layer;
   the optical layer comprises a substrate layer, a polarizing layer, a first retardation layer, and a second retardation layer that are sequentially laminated, wherein the second retardation layer is bonded to the reinforcing layer by the first adhesive layer;
   an edge of the substrate layer is provided with a protrusion protruding from an edge of another layered structure of the main body, wherein the shear thickening material layer extends from the side surface of the reinforcing layer to a surface, facing towards a side of the reinforcing layer, of the protrusion.

17. A display device, comprising the display module according to claim 16.

* * * * *